US007860960B1

(12) United States Patent
Knight et al.

(10) Patent No.: US 7,860,960 B1
(45) Date of Patent: Dec. 28, 2010

(54) METHOD AND APPARATUS FOR DYNAMIC MONITORING AND ALARM CAPABILITY

(75) Inventors: Timothy J. Knight, Shrewsbury, MA (US); Darren J. Hayduk, Wilmington, MA (US); David A. Choiniere, Attleborough, MA (US); Venu G. Moogala, Marlborough, MA (US); Mark E. Pawela, Hopkinton, MA (US)

(73) Assignee: Oracle America, Inc., Redwood City, CA (US)

( * ) Notice: Subject to any disclaimer, the term of this patent is extended or adjusted under 35 U.S.C. 154(b) by 1815 days.

(21) Appl. No.: 10/837,369

(22) Filed: Apr. 30, 2004

(51) Int. Cl.
*G06F 15/173* (2006.01)
(52) U.S. Cl. ...................... 709/223; 709/217
(58) Field of Classification Search ............... 709/224, 709/217, 223
See application file for complete search history.

(56) References Cited

U.S. PATENT DOCUMENTS

| | | | | |
|---|---|---|---|---|
| 5,913,037 A | * | 6/1999 | Spofford et al. | 709/226 |
| 6,108,782 A | * | 8/2000 | Fletcher et al. | 713/153 |
| 6,728,768 B1 | * | 4/2004 | Carney | 709/224 |
| 6,954,786 B1 | * | 10/2005 | Vered et al. | 709/223 |
| 2004/0019657 A1 | * | 1/2004 | Akiyama | 709/217 |

* cited by examiner

*Primary Examiner*—Frantz B Jean
(74) *Attorney, Agent, or Firm*—Brooks Kushman P.C.

(57) ABSTRACT

A method and apparatus is provided for monitoring a variable of concern across multiple dynamic instances of a MIB object. The collection mechanism is associated with an interface that receives the executable command. The executable command is in an encoded format identifying one or more objects the collection mechanism is responsible for. This avoids the need to send multiple executable commands to a network device in order to monitor and evaluate the values of multiple variables across multiple MIB object instances.

25 Claims, 4 Drawing Sheets

```
(config-device-eFunds_Retail)# monitor loadBalance realService statistics ?
[name <NamedIndex>]                Name of the real service
[bytesSent <counter64>]            TX byte counter
[bytesReceived <counter64>]        RX byte counter
[packetsSent <counter32>]          TX packet counter
[packetsReceived <counter32>]      RX packet counter
[openSessions <counter32>]         Cumulative open sessions
[closedSessions <counter32>]       Cumulative closed sessions
[currentSessions <integer>]        Current open sessions to Real Service
[serverPeakSessions <integer>]     Peak active sessions
[serverObjectsSent <counter32>]    HTTP requests sent to real service
[serverObjectsReceived <counter32>]   HTTP responses received from real service
[serverConnectFailures <counter32>]   L4 Failures connecting to real service
[serverWriteFailures <counter32>]  L4 failures when writing to this real service
[serverReadFailures <counter32>]   L4 failures when reading from this real service
[serverInvalidHTTPResponses <counter32>]  Invalid HTTP responses from this real service
[currentPooled <integer>]          Current open pooled connections
[numPooled <integer>]              Number pooled connections used
(config-device-eFunds_Retail)# monitor loadBalance realService statistics name myHost* serverPeakSessions alarm ?
risingThreshold <text>             Upper threshold value, used for the comparison on each poll
[pollInterval (5..65535)]          Time between polls (default: 60)
[alarmInterval (5..65535)]         Interval, in seconds, between alarm queries (default: 60)
[sampleType (absoluteValue|deltaValue|...)] Sampling method for the variable (default: deltaValue)
[fallingThreshold <text>]          Lower threshold value, used for the comparison on each poll
[risingEventLevel (emergency|alert|critical|...)] Level of the syslog message sent for a rising alarm (default: warning)
[fallingEventLevel (emergency|alert|critical|...)] Level of the syslog message sent for a falling alarm (default: none)

(config-device-eFunds_Retail)# monitor loadBalance realService statistics name myHost* serverPeakSessions alarm 50
(config-device-eFunds_Retail)# exit
(config)# show rmon alarm
Index:              1
device:             eFunds_Retail
Base Command:       device loadBalance realService statistics
Filter Field And Values:   name myHost*
Monitor Field:      serverPeakSessions
Poll Interval:      60
Alarm Interval:     60
Sample Type:        deltaValue
Rising Threshold:   50
Falling Threshold:  50
Rising Event Level: warning
Falling Event Level: none
Poll Check Count:   0
Alarm Check Count:      0
Result Count:       0
Current Result Count:   0
Total Rising Triggered Count: 0
Total Falling Triggered Count: 0
Rising Alarm Generated Count: 0
Falling Alarm Generated Count: 0
Last Poll Time:     N/A
Last Alarm Time:    N/A
(config)#
```

*Fig. 3*

METHOD AND APPARATUS FOR DYNAMIC MONITORING AND ALARM CAPABILITY

TECHNICAL FIELD OF THE INVENTION

This invention relates generally to communications networks, and more particularly, to monitoring of network devices forming the communications network.

BACKGROUND OF THE INVENTION

Simple Network Management Protocol (SNMP) and Remote Network Monitoring (RMON) are standards that provide a set of protocols for network management and control, including a specification for a data structure, and a set of data objects. SNMP and RMON are implemented in a network using one or more collection mechanisms such as, a probe or an agent, and management information bases (MIBs), which contain MIB objects specifying the data to be collected and other information pertinent to the purpose of network monitoring.

RMON utilizes SNMP to provide standard information that a network administrator can use to monitor, analyze, and troubleshoot a group of distributed network devices to determine an operational characteristic of a network or one or more network devices. RMON capabilities are defined by the Internet Engineering Task Force (IETF) in Request For Comment (RFC) 1757. RFC 1757 defines a probe capable of monitoring an Ethernet segment and transmitting statistical information back to an RMON compatible management station. An RMON probe is implementable in a network device in conjunction with an agent or outside the network device as a standalone collection mechanism for gathering data for a particular network segment.

RMON is well suited for tracking a number of statistics that represent an operational characteristic of one or more network devices. That is, an RMON probe of a network device stores the gathered information and forwards at the expiration of one or more sampling periods information to an RMON compatible management station.

RFC 1757 defines an RMON events group and an alarm group, which together assist in providing proactive management of a network device. An RMON configured network device can monitor itself or another network device. That is, at the expiration of a predetermined sampling period the network device samples a variable indicating a performance characteristic of the network device, and compares the value of the variable to one or more threshold values. An RMON alarm is generated if the value of the sampled variable crosses a threshold value.

For an RMON probe to sample and evaluate a value of a MIB object instance, the RMON probe must know the object identifier (OID) and instance number associated with the MIB object. However, within an SNMP agent there often exist multiple instances of a MIB object. As such, an RMON probe is often configured with an enumeration of values that identify each instance of the MIB object.

To configure an RMON probe in this manner is time consuming, error prone and as such, burdensome. Moreover, the current network devices support dynamic data, for example, data relating to a session that may or may not be stored after termination of the session. Nevertheless, it is beneficial to monitor statistics on dynamic data. However, because the data is dynamic an RMON probe must be configured to account for all identifiers relating to the dynamic data. Thus configuring an RMON probe with an enumeration of values for use in identifying the dynamic data to monitor is burdensome. Accordingly, there exists a need for a monitoring mechanism having RMON like functionality that automatically accounts for changes in the MIB object instance identifiers having a variable of concern to the RMON probe.

SUMMARY OF THE INVENTION

The present invention provides a method and apparatus for configuring a collection mechanism to automatically account for changes in instance identifiers. A collection mechanism in accordance with the present invention performs pattern matching to match an encoded expression representing one or more object instances, and performs an operation contained in the expression on each identified object instance. In this manner, a network administrator can configure a collection mechanism once with a query expression representing one or more object instances and at the expiration of each sampling interval, the collection mechanism searches a MIB tree and identifies each MIB object instance matching the query expression, and evaluates a value of a parameter of each MIB object instance. As such, the network administrator can monitor multiple MIB object instances indicating an operational characteristic of the network device without having to know the exact OID for each object instance. Accordingly, the use of dynamic table entries in a network device does not require the reconfiguring of one or more collection mechanisms to account for changes in OIDs. As such, a collection mechanism configured in accordance with the present invention evaluates an encoded expression at the expiration of each sampling period and identifies all possible MIB object instances matching the expression.

In one embodiment of the present invention, a network device is disclosed. The network device includes a management mechanism and a collection mechanism. The management mechanism is configured to receive a query request for evaluating a selected parameter from one or more locations of a data structure that indicates an operational characteristic of the network device. The collection mechanism is responsive to the query request and searches the data structure at expiration of a sampling period to identify each location in the data structure having the parameter of concern and, in turn, evaluate a value of the selected parameters at each of the one or more locations in the data structure matching at least a portion of the query request.

The network device can further include one or more input/output ports to receive network traffic and output network traffic. Further, the network device can include a plurality of collection mechanisms for searching the data structure at expiration of the sampling period to identify one or more locations in the data structure matching at least a portion of the query request and evaluating the value of the selected parameter at each of the one or more identified locations in the data structure. Each of the plurality of collection mechanisms can be associated with each of the one or more input/output ports. The network device can further include an interface accessible to a requestor for receiving the query request.

In another embodiment of the present invention, a method performed in a network device for obtaining information concerning an operational characteristic of the network device is disclosed. The method includes a step of receiving a request for information concerning an operational characteristic of the network device. In response to receiving the request, the method performs a step of configuring a mechanism of the network device with an encoded representation of one or more MIB object instances, the encoded representation having a format understandable by the mechanism allowing the mechanism to search a management information base (MIB) and identify each object instance matching an attribute of the request to obtain the information concerning an operational characteristic of the network device.

The method can further perform a step of parsing the request to identify the attribute and a step of evaluating a selected parameter of each identified MIB object to determine an operational state of the network device.

In another embodiment of the present invention, a network device readable medium encoded with a program that, when executed by a network device, performs a method for providing information related to an operational characteristic of the network device is disclosed. The readable medium holds steps for receiving a request for information related to an operational characteristic of the network device and determining from the request a plurality of entries in a management information base (MIB) associated with the network device. A further step held by the readable medium accesses a variable associated with each of the plurality of entries to provide a requestor with information related to the operational characteristic of the network device.

The readable medium can hold a further step of parsing the request to identify an indicator identifying one or more MIB object instances identifying the plurality of entries in the MIB. An additional step held by the readable medium can include a step of, generating an event if a value of one of the variables crosses a threshold value. The readable medium can further hold a step for generating a trap if a value of one of the variables crosses a threshold value.

In yet another embodiment of the present invention, a monitoring mechanism is disclosed. The monitoring mechanism includes a data structure holding an encoded representation of one or more OID's for one or more MIB object instances. The monitoring mechanism is configured to evaluate the encoded representation at expiration of a sampling period to compare a value of a variable associated with each of the one or more MIB objects to one or more threshold values. The monitoring mechanism also includes an interface to receive the encoded representation.

BRIEF DESCRIPTION OF THE DRAWINGS

An illustrative embodiment of the present invention will be described below relative to the following drawings.

FIG. 3 is an exemplary command line interface session script for configuring a collection mechanism in accordance with the illustrative embodiment of the present invention.

DETAILED DESCRIPTION

The illustrative embodiment of the present invention provides a method and apparatus to configure a collection mechanism via a user interface with an encoded representation of one or more MIB object instances. The collection mechanism understands the format of the encoded representation and at the expiration of a sampling period decodes the encoded representation and reports the MIB object instance information associated with the encoded representation. The encoded representation supports monitoring of dynamic SNMP table entries avoiding the need for a network administrator to reconfigure the collection mechanism each time an index value in a table changes. The present invention allows the configuration of an alarm polling scheme to monitor persistent data (i.e., user configured data), or dynamic data (i.e., state based data).

Before continuing with the discussion below it is helpful to first define the use of a few terms.

The term "network device", refers to an electronic device or apparatus configured for use in a network environment that is able to understand and perform operations with data according to a data communication protocol. Examples of a network device include, but are not limited to, a switch, a router, a server, a bridge, a workstation, a laptop, a desktop PC, a mainframe, a network appliance including a load balancer, a firewall, intrusion detection system (IDS) device, and the like.

The term "collection mechanism" or "monitoring mechanism" refers to a hardware or software component that collects network related information for the purpose of monitoring network activity.

The term "management station", refers to an electronic device configured to execute an application for interacting with a collection mechanism. Common management station functions include network topology mapping, event trapping with alarms, traffic monitoring, network diagnostic functions, report generators, historical record management, and trend analysis.

Figure 1:
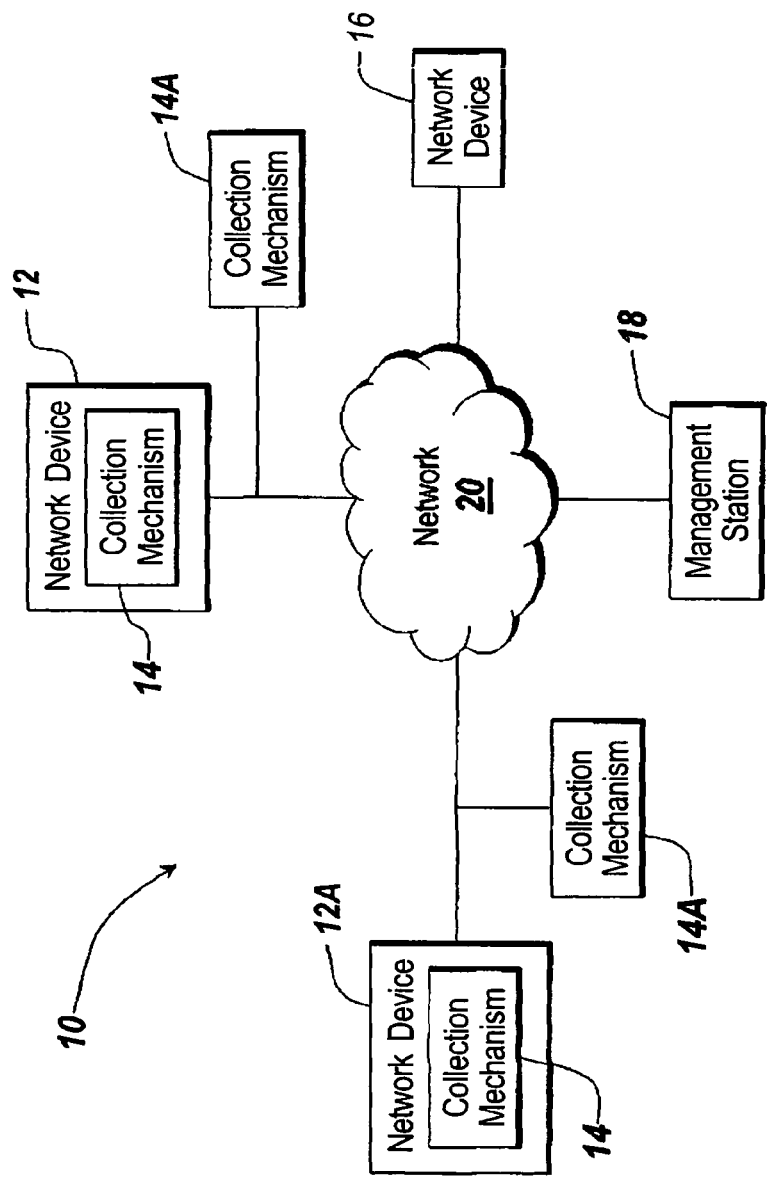
FIG. 1 is an exemplary block diagram illustrating an environment suitable for practicing the illustrative embodiment of the present invention.

FIG. 1 illustrates an exemplary network environment suitable for practicing the illustrative embodiment of the present invention. Network environment 10 includes network devices 12 and 12A, network device 16, management station 18, and network 20. Network devices 12 and 12A, network device 16, and management station 18 are capable of communicating with each other across network 20 using one or more communication protocols and are further capable of communicating with one or more network devices associated with another network (not shown). Network 20 can be the Internet, an intranet, a LAN, a WAN, or other suitable network either wired, wireless or a hybrid of wired and wireless.

Network devices 12 and 12A each include collection mechanism 14. Collection mechanism 14 is capable of collecting values of one or more parameters indicating an operational characteristic of the network device associated with the collection mechanism. Alternatively, collection mechanism 14A is capable of collecting values of one or more parameters indicating an operational characteristic of a portion or segment of network 20, network device 16, or both. Collection mechanisms 14 and 14A, in response to a request, are further capable of transmitting statistical information concerning the associated network device or associated segment of network 20 to management station 18. Collection mechanisms 14 and 14A can be an RMON probe or an RMON agent. As such, management station 18 is configurable as an RMON compatible network management station able to communicate with network devices 12 and 12A, and network device 16 using SNMP commands.

Management station 18 communicates with collection mechanisms 14 and 14A using the IP suite of protocols. Management station 18 can configure and instruct collection mechanisms 14 and 14A, either collectively or individually, as to what data collect and what statistics to maintain about network devices 12, 12A, network device 16, and network 20. As will be discussed below in more detail, network device 12 and network device 12A provide an interface for a requestor such as, management station 18 or a user of management station 18 to communicate with collection mechanism 14 or 14A.

Figure 2:
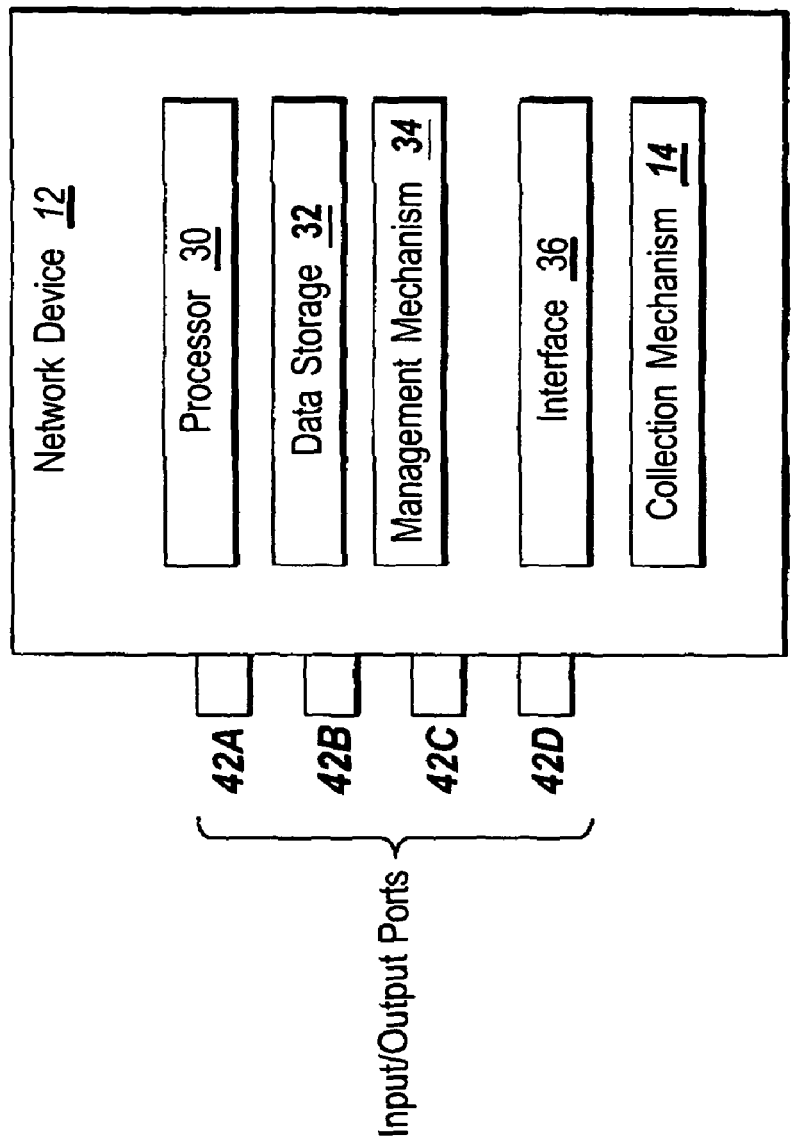
FIG. 2 is an exemplary block diagram of network device suitable for practicing the illustrative embodiment of the present invention.

FIG. 2 illustrates network device 12 in more detail. Those skilled in the art will recognize the features discussed in relation to network device 12 are equally applicable to network device 12A. Network device 12 includes processor 30, data storage device 32, management mechanism 34, interface 36, collection mechanism 14, and input/output ports 42A-42D. Those skilled in the art will appreciate that the input/output ports network device 12 are configurable as discrete input ports for receiving network traffic and discrete output ports for outputting network traffic so as to couple to a transmission medium having a single primary conductor for carrying network traffic in one direction. Moreover, those skilled in the art will recognize the input/output ports 42A-42D each couple to a transmission medium having at least two primary conductors, with at least one primary conductor carrying network traffic in a first direction and at least one primary conductor carrying network traffic in a second direction.

Microprocessor 30 is configured to execute various instructions and programs, and control various hardware and software components such as network interface cards and various software components and mechanisms such as, but not limited to agents and probes. Data storage device 32 provides storage for one or more executable programs, such as one or more OS programs and various other program applications developed in a variety of programming environments for controlling device software and hardware components. Data storage device 32 can further hold data collected by collection mechanism 14, for example a log.

Management mechanism 34 is configured to receive a query request from a requestor for configuring collection mechanism 14 to collect and if desired evaluate a value of a selected parameter that represents an operational characteristic of the network device. Collection mechanism 14 is configurable in response to the query request to search a MIB structure at expiration of a sampling period, locate in the MIB structure each MIB object instance or instances identified by the query request, and for each located MIB object instance evaluate the value of a variable or parameter of each instance of the MIB object identified by the query request. Those skilled in the art will recognize that evaluation of the value by the collection mechanism 14 or 14A can include the comparison of the value to an upper threshold value or to a lower threshold value or to both, to determine an absolute change in the value or a determine a delta change in the value.

The query request provides an encoded representation of one or more OIDs. The encoded representation of one or more OIDs allows collection mechanisms 14 and 14A to account for any MIB objects or any instances of a MIB object added to the MIB structure since the expiration of the last sampling period. In this manner, collection mechanisms 14 and 14A perform a matching operation in accordance with a rule such as, a regular expression for data extraction. As such, a network administrator does not have to reconfigure collection mechanisms 14 and 14A each time a MIB object instance is added, removed, or modified to the MIB structure because the encoded representation of OIDs held in a table of collections mechanisms 14 and 14A allow the mechanisms to search the MIB structure at each expiration of a sampling period and account for any added MIB object instance matching the encoded representation.

Once configured, collection mechanisms 14 and 14A can monitor a value of a variable or parameter associated with all MIB objects matching an encoded expression provided by management mechanism 34. As such, collection mechanisms 14 and 14A are capable of warning the network administrator if a parameter of a MIB object matching the encoded expression rises above a predefined threshold, falls below a predefined threshold or falls outside a predefined range. Collection mechanisms 14 and 14A are able to monitor a specific variable of a specific MIB object instance and trigger an RMON like alarm when the value crosses an upper threshold or crosses a lower threshold.

Interface 36 in conjunction with management mechanism 34 provides a user of network device 12 or management station 18 with an interface to construct an encoded query expression to evaluate a variable or parameter indicating an operational characteristic of the network 20 or network device 12. This allows a network administrator to configure a generic alarm polling scheme that provides alarm values for an alarm type across multiple MIB object instances without having to enter a specific OID for each MIB object instance in a table of the collection mechanism 14 or 14A. Interface 36 is configurable to be a command line interface (CLI), a graphical user interface (GUI), a menu driven interface or any other suitable user interface.

FIG. 3 illustrates an exemplary CLI script to configure collection mechanism 14 or 14A in accordance with the illustrative embodiment of the present invention. The exemplary CLI script depicted in FIG. 3 configures collection mechanism 14 or 14A using an alarm creation command (monitor loadBalance realService statistics name myHost* serverPeakSessions alarm 50) and the alarm output table (show rmon alarm). The alarm creation command includes an encoded representation "myHost*" representing one or more OIDs in a MIB structure. The encoded representation "myHost*" allows collection mechanisms 14 and 14A to automatically select all MIB objects in the OID string realServices having a naming convention beginning with "myHost*". As such, for each MIB object instance in a MIB structure under the MIB object "loadBalance realService statistics" having a name field matching "myHost*", for example, myHost1, myHost2, myHostBackEnd, the value of the variable serverPeakSessions for each MIB object matching "myHost*" is evaluated against a threshold value of 50 at expiration of a sampling period. Those skilled in the art will appreciate the encoded expression can be represented in other manners for example "myHost?" "myHost[0-9]" so on.

In this manner, collection mechanisms 14 and 14A are configurable to receive a query request having an encoded format that identifies one or more MIB object instances in a MIB structure having a variable the collection mechanism 14 or 14A is responsible for in some manner. The encoded format allows collection mechanisms 14 and 14A to expand the encoded query request and include all valid values of a variable of concern. As such, collection mechanisms 14 and 14A can monitor and evaluate an alarm associated with a number of MIB objects without having to construct an alarm table in collection mechanism 14 or 14A having a table entry for each MIB object having the variable of concern. That is, collection mechanism 14 or 14A can have one alarm table entry that holds the encoded query and as such, collection mechanisms 14 or 14A can identify each MIB object in a MIB having the variable of concern. As such, at expiration of a sampling period, collection mechanism 14 or 14A can expand or evaluate the single table entry and evaluate a variable of each MIB object matching the encoded format. As a consequence of the encoded format of the table entry, collection mechanisms 14 and 14A are able to learn in a dynamic manner each instance of a MIB object added without receiving any additional information from a network administrator or management station 18. As such, the present invention avoids the need for fixed OID entries and alarm entries as defined by RFC 1757.

Figure 4:
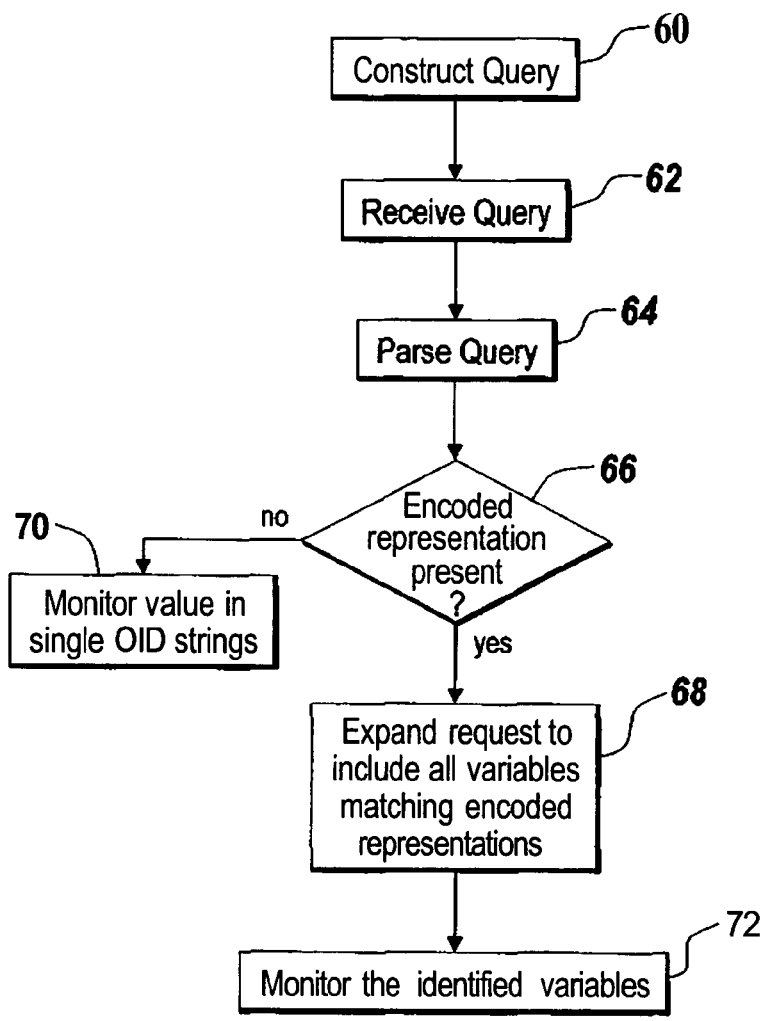
FIG. 4 is an exemplary block flow diagram illustrating steps taken to practice the illustrative embodiment of the present invention.

FIG. 4 illustrates an exemplary block flow diagram illustrating steps taken to practice the illustrative embodiment of the present invention. In step 60, a requestor such as a network administrator, or other requestor such as management station 18 constructs a query via interface 36 for configuring collection mechanism 14 or 14A to monitor one or more values of a parameter that indicates an operational characteristic of network device 12. In step 62, management mechanism 34 receives the query request via interface 36. In step 64, collection mechanism 14 or 14A parses the query request to identify if the query includes an encoded format identifying one or more OIDs. In step 66, should the collection mechanism 14 or 14A determine the query is not in an encoded format, collection mechanism 14 or 14A proceeds to step 70. In step 70, collection mechanism 14 or 14A monitors the requested value associated with the OID provided in the query request at expiration of the next sampling period.

If in step 66, if collection mechanism 14 or 14A determines the query includes the encoded format, collection mechanism 14 or 14A continues to step 68. In step 68, at expiration of a sampling period, collection mechanism 14 or 14A expands the encoded format by searching a MIB structure to identify all MIB objects that match the encoded format. In step 72, collection mechanism 14 or 14A monitors or evaluates the value of the variable or parameter identified in the encoded format across each identified MIB object instances identified by the encoded format.

While the present invention has been described with reference to an illustrative embodiment thereof, one skilled in the art will appreciate that there are changes in form and detail that may be made without departing from the intended scope of the present invention as defined in the pending claims. For example, the user interface 36 is adaptable and configurable as MIB browser interface. Moreover, the present invention can report events across multiple instances of MIB objects without a user having to send an executable command for each instance of a MIB object. As such, a user of a network device can configure an alarm for a particular SNMP index without having to walk a table of the MIB object to identify to the collection mechanism 14 or 14A each instance of the MIB object. That is, collection mechanism 14 or 14A at expiration of each sampling period evaluates the encoded query to determine which instances of one or more MIB objects to query and return values regarding the parameters of concern.

What is claimed is:

1. In a network device including a management information base (MIB) having a plurality of objects, a method for obtaining information concerning an operational characteristic of the network device, the method comprising steps of,
   receiving a request for information concerning an operational characteristic of the network device; and
   configuring a mechanism of the network device in response to the request that includes an encoded representation corresponding to two or more objects in the (MIB), the encoded representation having a format understandable by the mechanism allowing the mechanism to search the MIB and to identify the two or more objects in the MIB for obtaining the information concerning the operational characteristic of the network device.

2. The method of claim 1, further comprising a step of, parsing the request to determine if the request includes the encoded representation.

3. The method of claim 1, further comprising the step of, evaluating a selected parameter for each of the two or more objects in the MIB to determine an operational state of the network device.

4. The method of claim 1, wherein the network device comprises a switch.

5. The method of claim 1, wherein the network device comprises a router.

6. The method of claim 1, wherein the network device comprises a server.

7. The method of claim 1, wherein the network device comprises a bridge.

8. The method of claim 1, wherein the network device comprises a network appliance.

9. The method of claim 1, wherein the network device comprises an electronic device configured to support remote monitoring (RMON) alarm and event settings.

10. The method of claim 1, wherein the MIB comprises an RMON-MIB.

11. A network device readable non-transitory medium encoded with a program that, when executed by a network device, performs a method for providing information related to an operational characteristic of the network device, the method comprising steps of,
    receiving a request for information related to an operational characteristic of the network device;
    determining from the request a plurality of entries in a management information base (MIB) associated with the network device;
    accessing a variable associated with each of the plurality of entries to provide a requestor with information related to the operational characteristic of the network device;
    performing an action if a value of one of the variables crosses a threshold value; and
    generating a trap if the value of one of the variables crosses the threshold value.

12. The readable medium of claim 11, further comprising a step of, parsing the request to identify an indicator indicating one or more object identifiers (OIDs) identifying the plurality of entries in the MIB.

13. The readable medium of claim 12, further comprising a step of, generating an event if a value of one of the variables crosses a threshold value.

14. The readable medium of claim 12, wherein the step of performing an action comprises a step of, generating an email if the value of one of the variables crosses the threshold value.

15. The readable medium of claim 12, wherein the step of performing an action comprises a step of, generating an SNMP trap if the value of one of the variables crosses the threshold value.

16. The readable medium of claim 12, wherein the step of performing an action comprises a step of, generating an event if the value of one of the variables crosses the threshold value.

17. A device for determining an operational characteristic of a network having a plurality of locations in a stored data structure; the device comprising:
    a management mechanism configured to receive a query request for evaluating a selected parameter for each of two or more locations in the data structure, wherein each selected parameter indicates an operational characteristic of the device and the query request includes an object-based string corresponding to the two or more locations in the data structure; and
    a collection mechanism responsive to the query request for searching the data structure at an expiration of a sampling period to identify each of the two or more locations in the data structure that matches the object-based string and evaluating a value for each selected parameter at each of the two or more locations identified in the data structure.

18. The device of claim 17, further comprising,
one or more input/output ports to receive network traffic and output network traffic.

19. The device of claim 18, further comprising,
a plurality of collection mechanisms for searching the data structure at expiration of the sampling period to identify each of the two or more locations in the data structure that matches the object-based string and evaluating the value for each selected parameter at each of the two or more locations identified in the data structure.

20. The device of claim 17, wherein the selected parameter is associated with an object identifier (OID) held by the data structure.

21. The device of claim 17, further comprising an interface accessible to a requestor for receiving the query request.

22. The device of claim 17, wherein the collection mechanism comprises an agent.

23. The device of claim 22, wherein the agent comprises an RMON probe.

24. The device of claim 17, wherein the collection mechanism comprises a monitoring probe.

25. A network device readable non-transitory medium encoded with a program that, when executed by a network device, performs a method for providing information related to an operational characteristic of the network device, the method comprising:
receiving a request for information related to an operational characteristic of the network device;
determining from the request a plurality of entries in a management information base (MIB) associated with the network device;
accessing a variable associated with each of the plurality of entries to provide a requestor with information related to the operational characteristic of the network device, wherein the request includes an object-based string corresponding to the plurality of entries in the MIB;
performing an action if a value of one of the variables crosses a threshold value; and
generating a trap if the value of one of the variables crosses the threshold value.

\* \* \* \* \*